Nov. 1, 1960 S. STOKLAND 2,958,531
APPARATUS FOR DISTRIBUTING FERTILIZER
OR OTHER GRANULAR MATERIAL
Filed March 25, 1958 2 Sheets-Sheet 1

INVENTOR
Signund Stokland
By Kurt Kelman
AGENT

Nov. 1, 1960
S. STOKLAND
2,958,531
APPARATUS FOR DISTRIBUTING FERTILIZER
OR OTHER GRANULAR MATERIAL
Filed March 25, 1958
2 Sheets-Sheet 2
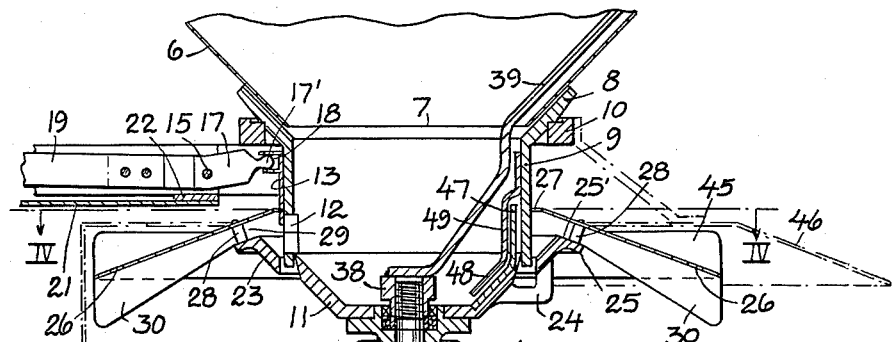
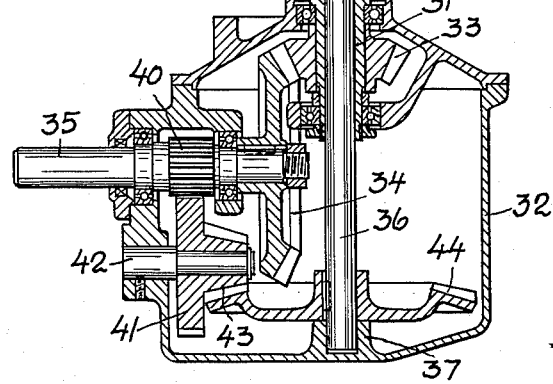
Fig_3_
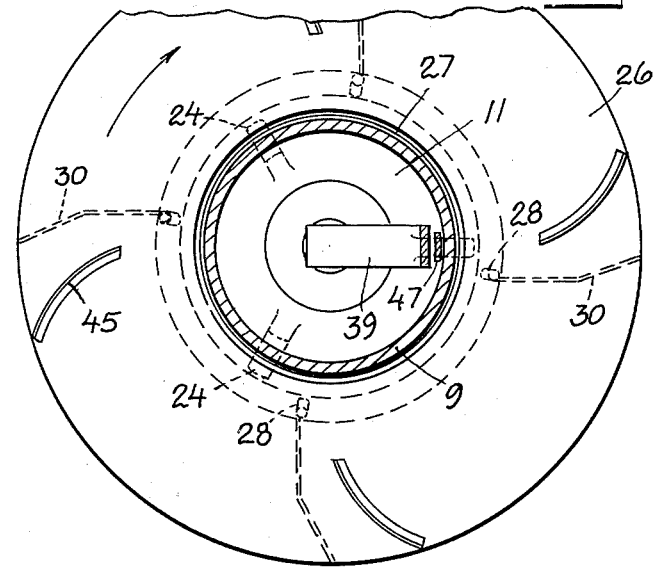
Fig_4_
INVENTOR
Sigmund Stokland
By Kurt Kelman
AGENT

United States Patent Office 2,958,531
Patented Nov. 1, 1960

2,958,531

APPARATUS FOR DISTRIBUTING FERTILIZER OR OTHER GRANULAR MATERIAL

Sigmund Stokland, Nygards Alle 3, Oslo, Norway

Filed Mar. 25, 1958, Ser. No. 723,741

Claims priority, application Norway Mar. 28, 1957

15 Claims. (Cl. 275—15)

This invention relates to an apparatus for distributing fertilizer or other granular material, and more particularly to an apparatus of the type wherein a container for the material to be distributed is positioned above a distributing member mounted for rotation about a vertical axis and wherein means are provided for feeding material from the container to the distributing member.

It is an object of the present invention to provide an apparatus of the type referred to in which a comminuted or granular material may be fed from the container to the distributing member in regulatable quantities which may be held constant regardless of the consistency of the material and of the speed of rotation of the apparatus.

A further object of the invention is to provide in an apparatus of the above described type a distributing member which distributes the material evenly over a constant area of the field during all speeds of rotation.

According to the present invention there is provided in an apparatus of the above defined type a mouth-piece communicating at its upper end with an outlet of the container and surrounding with its lower end an upwardly diverging feeding cup disposed for rotation about a vertical axis, there being at least one regulatable opening in the wall of the mouth-piece, so that a material flowing from the container into the feeding cup may be discharged through each opening to rotatable distributing means coaxially mounted about the feeding cup.

An embodiment of the invention is illustrated in the accompanying drawings, in which:

Figure 3 is a vertical, axial section through the apparatus with part thereof removed; and Figure 4 is a section taken on the line IV—IV of Fig. 3 with parts broken away.

Figure 1:
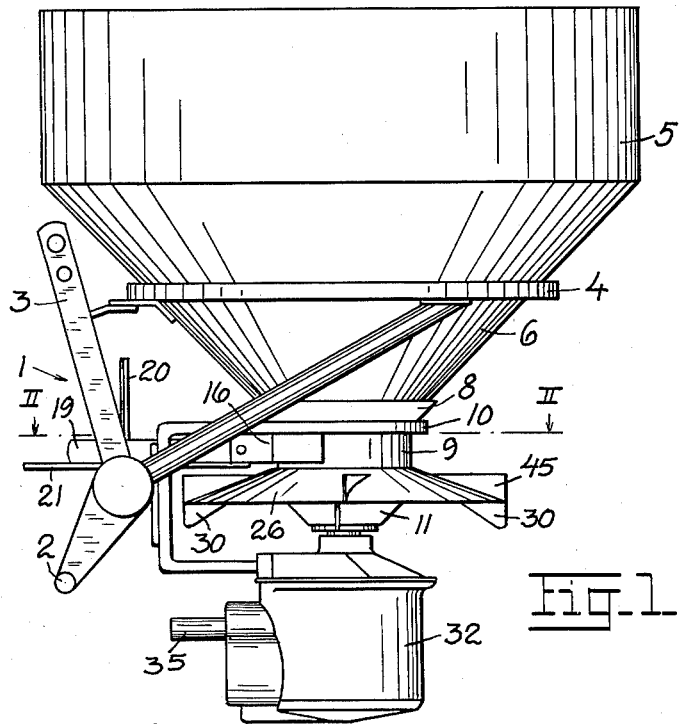
Figure 1 is side elevational view of an apparatus according to the present invention.
Figure 2:
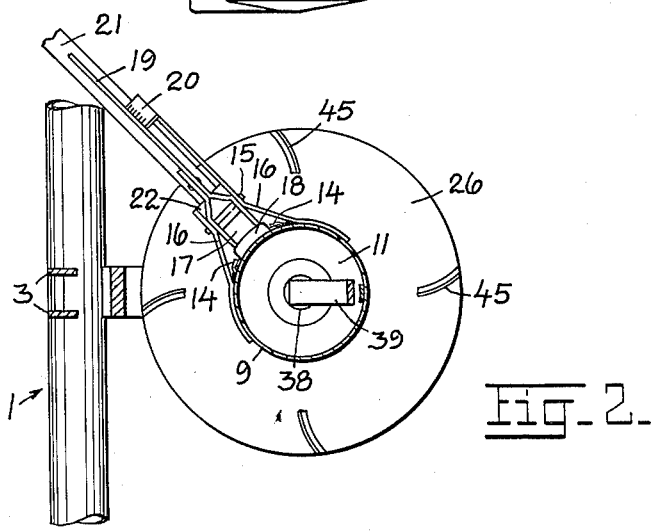
Figure 2 is a section taken on the line II—II of Fig. 1.

In the drawings 1 indicates a support frame adapted to be connected to the hitch linkage of a tractor, the frame being provided with pins 2 and upright arms 3 for connection to the lower links and to the top link, respectively, of the linkage.

The frame 1 comprises an upper, horizontal ring-shaped portion 4 in which is supported a storage container 5 for the material to be distributed. The container 5 is provided with a funnel-shaped lower portion 6 having an outlet or discharge opening 7.

The lower end portion of funnel 6 extends freely into a frusto-conical upper end portion 8 of a cylindrical mouth-piece member 9 supported for rotation about a vertical axis in a second or lower ring-shaped member 10 of the support frame 1.

An upwardly diverging, feeding cup 11, which is preferably frusto-conical in shape, is mounted for rotation about a vertical axis and so disposed that the lower part of the mouth-piece 9 surrounds the upper open end of said cup 11. In the wall of the mouth-piece 9, there is formed a preferably square opening 12 having its lower side edge approximately level with the upper rim of the feeding cup 11.

In order to regulate the free area of the opening 12 a closure member 13, having the form of a damper, is slidably mounted in vertical guides 14 secured to the mouth-piece 9 at each side of opening 12. The damper 13 may be adjusted in vertical direction to thereby bring about corresponding reductions or increases in the free area of the opening 12. In order that the free area of the opening 12 should obtain a greater height at the middle than at both sides thereof the damper 13 may be formed with a concave lower edge. More than one regulatable opening may be formed in the mouth-piece 9.

For actuating the damper 13 a two-armed lever is pivoted on a pivot pin 15 supported in substantially radial arms 16 secured to the mouth-piece 9. The relatively short inner arm 17 of said lever projects with a rounded end 17' into a channel portion 18 formed on damper 13, and the relatively long outer arm 19 of the lever cooperates with a scale 20 so that the exposed area of the opening 12 may be accurately adjusted during movement of the arm 19 in vertical direction.

A radially directed lever 21 is secured by means of a cross-piece 22 to the undersides of the arms 16 and serves as a means for rotating the mouth-piece 9 in the support ring 10 in order to adjust the position of the opening 12 therein with respect to the longitudinal vertical plan of the apparatus. Said lever 21 may cooperate with a scale (not shown) indicating different distributing directions.

The distributing device comprises a hollow frusto-conical member 23 surrounding the lower end portion of the mouth-piece 9. Said member 23 is connected to the feeding cup 11 by means of a number of angle-shaped arms 24, evenly distributed about the circumference thereof. The upper end of member 23 is formed with an outer flange 25 the upper surface 25' of which encloses an acute angle with the axis of said member, the angle being adapted to the chosen distributing direction.

Above the member 23 is mounted a shield 26 which is of frusto-conical shape and is formed with an upper opening 27 through which the mouth-piece 9 passes freely. The wall of the shield 26, which latter is preferably made of sheet material, encloses an angle with the horizontal corresponding to that of the upper surface 25' of the flange 25 and is secured to the latter; distance pieces or spacing members 28 being interposed between surface 25' and shield 26 so as to provide therebetween a ring-shaped space 29. The shield 26 having an outer diameter which is greater than that of the member 23 acts as a baffle and guides the material thrown out by the member 23 exactly in the desired direction, regardless of the rate of speed at which the distributing device rotates.

A number of substantially radially arranged distributing vanes is secured to the underside of the shield 26. The vanes 30 are evenly distributed and, as is best shown in Fig. 4, extend from the outer rim of the shield inwardly toward the distance pieces 26.

The feeding cup 11 is secured to a hollow shaft 31 which is supported for rotation about a vertical axis in a gearbox 32 supported in the frame 1. Shaft 31 carries a bevel gear 33 meshing with a second bevel gear 34 secured to a horizontal shaft 35 which latter is rotatably supported in the box 32 and the front end of which projects from the box and may be connected to the power output shaft of the tractor.

A vertical shaft 36 is rotatably supported in the hollow shaft 31 and in a bearing 37 at the bottom of the box 32, and projects with its upper end through an opening in the bottom of the feeding cup 11. On said upper end is threaded a nut 38 to which is secured, such as by welding, the lower end of a stirring member 39 extending upwardly through the mouth-piece 9 and thereafter parallel to the inner surface of the funnel 6 and preferably near thereto as shown.

The shaft 36 is driven by a pinion 40 on the shaft 35 meshing with an idler gear wheel 41 rotatably supported on a pivot 42. A bevel gear 43, secured to or formed integrally with the gear wheel 41, meshes with a bevel gear 44 secured to the shaft 36.

The transmissions are so chosen that the feeding cup 11 rotates at a speed greater than the speed of driving shaft 35, while the stirring member 39 rotates at a speed considerably less than the speed of the driving shaft. The speed ratio between the shaft 35 and the cup 11 and shaft 36, respectively, may be chosen at will. The stirring member 39 serves to prevent bridging of the material in the storing container.

When the apparatus is in operation the feeding cup 11 and the distributor 23 rotate at the same speed and material flows from the container 5, 6 through the outlet 7 thereof into the mouth-piece 9 and the cup 11. Due to the centrifugal force, the material flows upwardly along the diverging wall of the cup 11 and is discharged through the opening 12 onto the inner conical surface of the distributing member 23 from which it is expelled by centrifugal force and is thereupon thrown against the shield 26 which guides the material outwardly through the space 29 and between the vanes 30 so that the material is evenly distributed in a direction parallel to the shield 26. By this arrangement the material is always discharged at the same angle with respect to the horizontal and is thereby distributed over a constant area of the field regardless of the rate of angular speed of the distributor.

The amount of material supplied through the opening 12 to the distributing member may be exactly regulated by adjusting the free area of the opening 12.

When dry, granulated or any other comminuted material is to be distributed it is accompanied by greater or lesser quantities of dust. In order to remove the dust and to distribute it over the field a number of fan vanes 45 may be arranged at the upper side of the shield 26 so as to produce an outwardly directed stream of air above the discharged material. In order to direct the stream of air in a direction parallel to the stream of material a stationary shield 46 may be mounted above the vanes 45 as indicated in broken lines in Fig. 3.

When a material which is more or less sticky is to be distributed it may happen that the material adheres to the wall of the mouth piece 9 and also to the cup 11 so that the latter is more or less filled with a quantity of material adhering thereto whereby the rate of feed through the opening 12 becomes uneven.

In order to avoid this drawback a stirring rod 47, preferably of square cross-section, is connected to the cup 11 and projects vertically upwardly beyond the rim thereof and adjacent to the inner surface of the mouth-piece 9. The upper end of rod 47 extends a little distance above the upper side edge of the opening 12. When the cup 11 is rotated, the rod 47 passes along the inner surface of the mouth-piece 9 and removes material adhering thereto and at the same time the rod aids in rotating the material in the lower part of the mouth-piece 9.

In order to avoid accumulation of sticky material in the cup 11 a scraper is mounted firmly with respect to the mouth-piece 9. The scraper comprises a substantially radially directed arm 48 inclined to follow the outline of the cup 11 with necessary moving clearance, and the arm comprises a vertical portion 49 the upper end of which is secured to the wall of the mouth-piece 9 at a level above the upper edge of opening 12 thereby allowing the stirring rod 47 to pass between the vertical portion 48 and the inner surface of mouth-piece 9 when the cup 11 rotates. Because the arm 48 is positioned close to the inner surface of the cup 11, the material is prevented from accumulation at and from adhering to the cup, whereby any interference with the rate of material discharge through the opening 12 is avoided.

As materials of different consistencies will pass through the distributing device at different speeds, the middle axis of the distributed material may be displaced laterally with respect to the moving direction of the apparatus. Due to the adjustable mounting of the mouth-piece 9 such displacement may be corrected by rotating the mouth-piece through a given angle. The adjustable mounting of member 9 also renders it possible to spread the material to either side of the direction in which the apparatus is moved.

I claim:

1. An apparatus for distributing granular and like materials comprising, in combination: a container for receiving a supply of material, the container having an outlet; a mouth-piece having an upper end in communication with said outlet, a circumferential wall defining at least one regulatable opening, and a lower end; an upwardly diverging feeding cup rotatable about a substantially vertical axis and having an upper end near to and beneath said opening, and surrounded by the lower end of said mouth-piece; rotatable distributing means coaxial with and disposed about said cup; and means for rotating said cup and said distributing means whereby the material passing from said container through said mouth-piece and into said cup is caused by centrifugal force to flow upwardly in said cup through said opening and is spread by said distributing means when said cup and said distributing means rotate.

2. An apparatus as set forth in claim 1, wherein the means for rotating said cup and said distributing means comprises a support member common to and coaxially rotatable with said feeding cup and with said distributing means.

3. An apparatus as set forth in claim 1, wherein said distributing means comprises substantially circular and downwardly inclined baffle means in the path of material discharged through said opening whereby the material is spread in a given direction regardless of the speed at which said cup and said distributing means rotate.

4. An apparatus as set forth in claim 1, further comprising closure means supported by and movable with respect to said mouth-piece for regulating the exposed area of said opening.

5. An apparatus as set forth in claim 1, further comprising means for angularly adjusting the mouth-piece about said vertical axis.

6. An apparatus for distributing granular and like materials comprising, in combination: a container for receiving a supply of material, the container having a funnel-shaped outlet; a mouth-piece having an upper end in communication with said outlet; a circumferential wall defining at least one regulatable opening, and a lower end; an upwardly diverging feeding cup rotatable about a substantially vertical axis and having an upper end near to and disposed beneath said opening, and surrounded by the lower end of said mouth-piece; distributing means comprising an annular distributing member disposed in surrounding relationship about and connected for rotation with said cup, said distributing member having a distributing surface adjacent to said opening, and an outwardly and downwardly diverging annular shield having an underside and an outer diameter greater than the outer diameter of said distributing member, said shield having an inner portion disposed above, spaced from and connected with said distributing member, said inner portion defining with the distributing member a ring-shaped space; and means for rotating said cup and said distributing member whereby the material passing from said container through said mouth-piece and into said cup is caused by centrifugal force to flow upwardly in said cup through said opening and is directed by said surface toward said shield to pass through said space and to be spread outwardly along the underside of said shield.

7. An apparatus as set forth in claim 6, wherein said distributing means further comprises a plurality of vanes secured to the underside of said shield and extending outwardly from said space.

8. An apparatus as set forth in claim 6, wherein said distributing surface is of downwardly and outwardly diverging frusto-conical shape.

9. An apparatus as set forth in claim 6, wherein the means for rotating said cup and said distributing member comprises a substantially vertical shaft connected for rotation with said cup, a driving shaft, and transmission means for rotating the vertical shaft when said driving shaft rotates.

10. An apparatus as set forth in claim 6, further comprising stirring means including a member extending into said mouth-piece and into said container, and means for rotating said stirring member.

11. An apparatus as set forth in claim 6, wherein the means for rotating said cup and said distributing member comprises a substantially vertical hollow shaft connected for rotation with said cup, a driving shaft, and transmission means operatively connecting said driving shaft with said hollow shaft for rotating the latter at a first speed; and further comprising stirring means including a third shaft coaxially and rotatably received in said hollow shaft and having an upper end extending into said cup, a stirring member connected to the upper end of said third shaft, said stirring member extending into said mouth-piece and said container, and second transmission means operatively connecting said driving shaft with said third shaft for rotating the latter together with said stirring member at a second speed when said driving shaft rotates.

12. An apparatus as set forth in claim 6, wherein said mouth-piece has an inner surface and further comprising stirring means connected to said cup and extending upwardly into and along the inner surface of said mouth-piece.

13. An apparatus as set forth in claim 12, wherein said stirring means comprises a rod of substantially square cross-sectional contour, said rod having an upper end extending upwardly into said mouth-piece substantially to the level of the upper end of each said opening.

14. An apparatus as set forth in claim 6, wherein said cup has an inner surface and further comprising stationary scraper means extending into and close to the inner surface of said cup.

15. An apparatus as set forth in claim 14, wherein said scraper means is a radial arm connected to said mouth-piece.

References Cited in the file of this patent

UNITED STATES PATENTS

| | | |
|---|---|---|
| 396,251 | Adamson | Jan. 15, 1889 |
| 883,564 | Parrish | Mar. 31, 1908 |
| 1,107,992 | Parrish | Aug. 18, 1914 |
| 1,682,735 | Bergerioux | Sept. 4, 1928 |

FOREIGN PATENTS

| | | |
|---|---|---|
| 119,039 | Sweden | June 17, 1947 |